US009765480B2

United States Patent
Schmit et al.

(10) Patent No.: US 9,765,480 B2
(45) Date of Patent: Sep. 19, 2017

(54) INSTALLATION FOR DRYING A DAMP NON-WOVEN WEB

(71) Applicant: ANDRITZ PERFOJET SAS, Montbonnot (FR)

(72) Inventors: Laurent Schmit, Le Versoud (FR); Alain Planet, Barraux (FR)

(73) Assignee: ANDRITZ PERFOJET SAS, Montbonnot (FR)

( * ) Notice: Subject to any disclaimer, the term of this patent is extended or adjusted under 35 U.S.C. 154(b) by 0 days.

(21) Appl. No.: 14/972,143

(22) Filed: Dec. 17, 2015

(65) Prior Publication Data
US 2016/0177508 A1 Jun. 23, 2016

(30) Foreign Application Priority Data

Dec. 17, 2014 (FR) ...................................... 14 02884

(51) Int. Cl.
| F26B 13/16 | (2006.01) |
| D21F 5/18 | (2006.01) |
| F26B 21/00 | (2006.01) |
| F26B 21/04 | (2006.01) |
| F26B 21/12 | (2006.01) |
| F26B 23/00 | (2006.01) |

(52) U.S. Cl.
CPC ................ D21F 5/18 (2013.01); F26B 13/16 (2013.01); F26B 21/004 (2013.01); F26B 21/04 (2013.01); F26B 21/12 (2013.01); F26B 23/002 (2013.01); Y02P 70/405 (2015.11)

(58) Field of Classification Search
CPC ........ F26B 13/00; F26B 13/16; F26B 21/004; F26B 21/04; F26B 21/12; F26B 23/002; D21F 5/18; Y02P 70/405

USPC .......................................................... 34/618
See application file for complete search history.

(56) References Cited

U.S. PATENT DOCUMENTS

| 3,525,164 | A | | 8/1970 | Brown | |
| 5,306,395 | A | * | 4/1994 | Myren | ..................... D21F 9/003 162/111 |
| 5,775,002 | A | * | 7/1998 | Iwase | ..................... F26B 13/104 29/2 |
| 5,853,429 | A | | 12/1998 | Heine et al. | |
| 5,974,691 | A | * | 11/1999 | Marchal | ..................... D21F 5/20 34/122 |
| 6,021,583 | A | * | 2/2000 | Stelljes, Jr. | ............. D21F 5/182 34/116 |
| 6,199,296 | B1 | * | 3/2001 | Jewitt | ..................... D21F 5/182 34/115 |
| 6,551,461 | B2 | | 4/2003 | Hermans et al. | |

(Continued)

FOREIGN PATENT DOCUMENTS

| DE | 102007006960 | * | 8/2008 | ............... D21F 5/02 |
| EP | 0 743 381 A2 | | 11/1996 | |

(Continued)

OTHER PUBLICATIONS

French Search Report (Application No. FR 1402884) (2 pages—dated Jun. 12, 2015).

Primary Examiner — Stephen M Gravini
(74) Attorney, Agent, or Firm — Renner, Kenner, Greive, Bobak, Taylor & Weber

(57) ABSTRACT

An installation for drying a non-woven web includes a device (10, 11), a diffusion chamber (10) having an outlet fitting (21) in which there is mounted a perforated sheet (24) creating a drop in pressure.

20 Claims, 5 Drawing Sheets

(56) References Cited

U.S. PATENT DOCUMENTS

| | | | | |
|---|---|---|---|---|
| 7,040,038 B1* | 5/2006 | Beaumont | ............... | F26B 13/16 |
| | | | | 162/204 |
| 7,841,103 B2* | 11/2010 | Hada | ....................... | D21F 5/182 |
| | | | | 100/170 |
| 8,196,314 B2* | 6/2012 | Munch | ....................... | D21F 5/02 |
| | | | | 162/115 |
| 2002/0066204 A1 | 6/2002 | Barberi | | |
| 2004/0099393 A1 | 5/2004 | Jewitt | | |
| 2015/0198368 A1* | 7/2015 | Schmit | .................... | F26B 21/08 |
| | | | | 34/443 |
| 2016/0177508 A1* | 6/2016 | Schmit | ..................... | D21F 5/18 |
| | | | | 34/618 |

FOREIGN PATENT DOCUMENTS

| | | | | |
|---|---|---|---|---|
| FR | 1 182 636 | | 6/1959 | |
| FR | 2836401 A1 * | | 8/2003 | ............. D04H 18/04 |
| FR | WO 2007144480 A1 * | | 12/2007 | ......... B25B 27/0028 |
| FR | 3030705 A1 * | | 6/2016 | ............... D21F 5/18 |
| FR | EP 3034976 A2 * | | 6/2016 | ............... D21F 5/18 |
| FR | EP 3034976 A3 * | | 8/2016 | ............... D21F 5/18 |

* cited by examiner

INSTALLATION FOR DRYING A DAMP NON-WOVEN WEB

TECHNICAL FIELD

The present invention relates to installations for drying a non-woven web.

BACKGROUND ART

In U.S. Pat. No. 6,551,461 B2 a process is described for drying a damp web by passing across the damp web, displaced by a means of transport, in an oven hot air which is thus dampened, by reheating a first portion of the dampened air and by passing it back across the damp web in the oven and by passing a second portion of the dampened air across the displaced damp web in a drying device upstream of the oven in the direction of displacement of the web.

It is found that the non-woven web thus obtained is not dried in a uniform manner.

DISCLOSURE OF THE INVENTION

The invention remedies this by means of an installation for drying a non-woven web, characterised in that it comprises:
 a fan,
 a heating oven having an inlet and an outlet,
 an inlet conduit which connects the delivery of the fan with the inlet of the oven and sends delivered air to the inlet of the oven,
 a heat source arranged in such a way that the air delivered in the inlet conduit is heated,
 an outlet conduit which connects the outlet of the oven with the intake of the fan,
 a branch conduit, in a branch of the inlet conduit upstream of the heat source, connecting the inlet conduit with the inlet of a drying device,
 a means of transport which displaces a web in the drying device and in the oven, the drying device being upstream of the oven in the direction of displacement of the web,
 a conduit for extracting the air from the drying device,
 the drying device comprises a diffusion chamber having an outlet fitting in which there is mounted a first perforated sheet creating a drop in pressure, and
 the perforated sheet has a void-rate gradient between 10% and 60%.

By mounting a first perforated sheet creating a drop in pressure in the outlet fitting of the diffusion chamber and, in a manner that is much preferred, by giving the perforated sheet a void-rate gradient that decreases from the inlet of the diffusion chamber, the air current passing across the damp web is made uniform and consequently so too is the humidity of the non-woven web leaving the installation.

The perforations of the first perforated sheet preferably have a diameter of 2 to 8 mm, and better still 2 to 4 mm. The thickness of this sheet preferably ranges from 1 to 3 mm (what is best is 1.5 mm).

What is understood by void rate is the relationship of the open surface of the sheet to the total surface. Preferably, the void rate is between 10% and 60%. Particularly good uniformization has been obtained when the void rate of the first perforated sheet ranges from 40 to 60% from the side of the inlet of the diffusion chamber to 10 to 20% opposite the inlet. It is preferable for the relationship between these void rates to be 1/4 to 1/6 and in particular approximately 1/5.

The chamber and the fitting are in particular of the same length and the same width. They can be presented in the form of parallelepipeds. Preferably, the inlet into the diffusion chamber is made through a small front side, this simplifying the manufacture of the chamber.

In accordance with a development, which may be independent of the presence of a void-rate gradient, the fitting can be clamped at a channel in which there is mounted a honeycombed bundle, preferably supported by a second perforated sheet having a void rate of 40% to 60%, the dimension of whose cells is greater than that of the perforations of the first perforated sheet and is of a length of 30 to 100 mm, preferably of 40 to 60 mm. The equivalent diameter of a cell is between 3 and 10 mm, preferably between 4 and 6 mm. The equivalent diameter D is calculated by $$D = \frac{4S}{P}$$

S being the section of the cell and P being the perimeter of the cell. The cells are preferably of a hexagonal cross-section. In a manner that is much preferred, length (in the axial direction of the channel)/equivalent D of the honeycomb is >10. The honeycombed bundle allows the flow to be oriented parallel to the direction of the channel and thus the transfer of the diffusion air towards the intake box to be maximized. However, the pollutant particles coming from the mass of fibres released by means of the fan pollute the honeycomb and give rise to instances of inhomogeneity of the flow as the honeycomb becomes clogged. The first perforated sheet also plays a part in filtration by avoiding pollution of the honeycombed bundle and the non-woven web. In this function and in a manner possibly independent of the void-rate gradient and/or the presence of the honeycomb, advantageously the first perforated sheet can also be covered by a thin metallic cloth having a void rate between 25% and 50% a dimension of perforations from 0.1 to 1 mm and a thickness between 0.5 and 2 mm, this ensuring even better filtration.

It is now the first perforated sheet that gets clogged most quickly. That is why there is provision, according to an embodiment of the invention, to mount it in a movable drawer which preferably has a handle outside the fitting. In order to replace the first perforated sheet, it is no longer necessary to unclamp the fitting from the channel. It suffices to take out the drawer in which the first perforated sheet is mounted, to take the first perforated sheet out of the drawer, to clean it, then to put it back in the drawer or put in a new one and to put the drawer back in place in the fitting. Maintenance of the installation is greatly facilitated.

BRIEF DESCRIPTION OF THE DRAWINGS

In the attached drawings, given solely by way of example.

PREFERRED EMBODIMENTS FOR CARRYING OUT THE INVENTION

Figure 1:
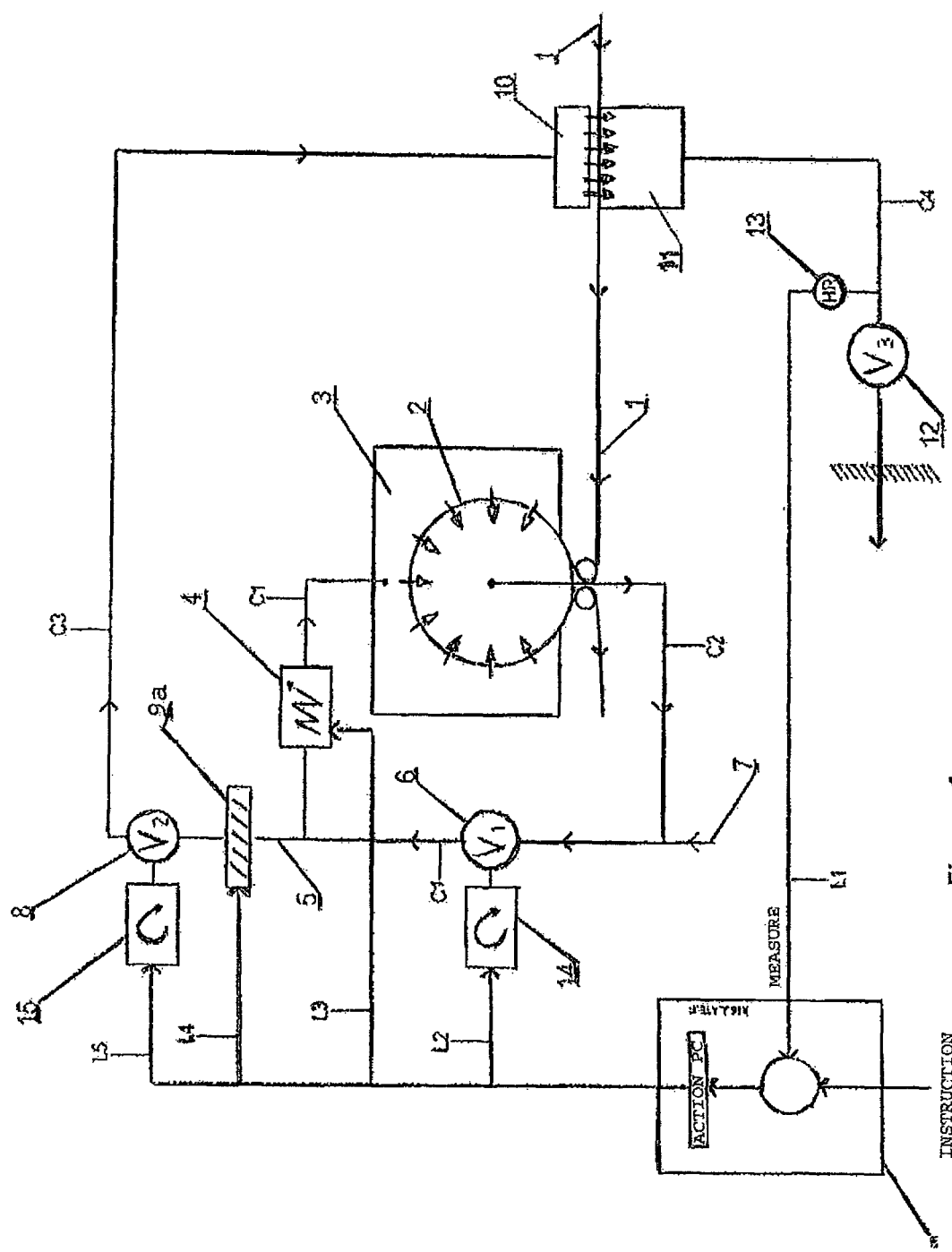
FIG. 1 shows the installation in accordance with the invention.

In FIG. 1, the dried web 1 circulates around a drum 2 or on a conveyor.

Hot air under pressure is injected through an inlet conduit C1 in the hood 3 thanks to a fan V1 6 (called main fan) and a heat source 4 which heats up the air. This heat source 4 can be, for example, a gas burner or an (oil, air, water or electrical) heat exchanger.

This hot air then passes over the damp web and the drum 2 (or the conveyor cloth): by means of this process, the water contained in the web is evaporated as the web advances on the drum 2 (or on the conveyor). The air which has passed over the web has been cooled and laden with moisture. It is then taken in by an extraction conduit C2 inside the drum 2 by means of the fan V1 6 and heated up anew by the heat source 4 and reinjected into the loop and so on.

The heat source 4 can be positioned upstream or downstream of the fan V1 6. It is preferably positioned downstream, as shown in the figure, in the case of an exchanger and upstream in the case of a gas burner.

The motor of this fan V1 6 is controlled by a frequency-variator 14.

The temperature of the hot air injected in the hood 3 is regulated by the action of the heat source 4.

A portion of the cooled and damp air is drawn off outside the loop so that the humidity is not concentrated in the circulation loop. Thus a portion of the cooled and damp air is drawn off by means of the branch conduit C3 thanks to the pressure generated by the fan V1 (6) at the outlet if this is sufficient or thanks to a supplementary branch fan V2 (8).

The branch conduit C3 can be connected upstream of V1.

Flaps 9a can be installed in the branch conduit C3 in order to be able to regulate the value of the extracted flow rate.

In the case where there is a branch fan V2 (8), the motor of this fan can be controlled by a frequency-variator. If there are regulating flaps 9, this control by means of a variator is unnecessary.

In order to make good this air deficit in the loop, reserve air is taken in in the production room upstream of the fan V1 through the reserve pipework 7.

The cooled and damp air drawn off by the branch conduit C3 is then injected into a diffusion box 10 which will diffuse the air above an intake drying box 11 which is located upstream of the oven 3 and on which the web that is to be dried circulates.

This intake drying box 11 can be located either in a conveyor (web support=cloth of conveyor) or in a cylinder (web support=nickel cylinder, perforated sheet, metallic cloth).

The air is taken in in the drying box 11 by means of a final extraction fan V3 12. This fan 12 is preferably positioned as close as possible to the drying box 11.

Figure 2:
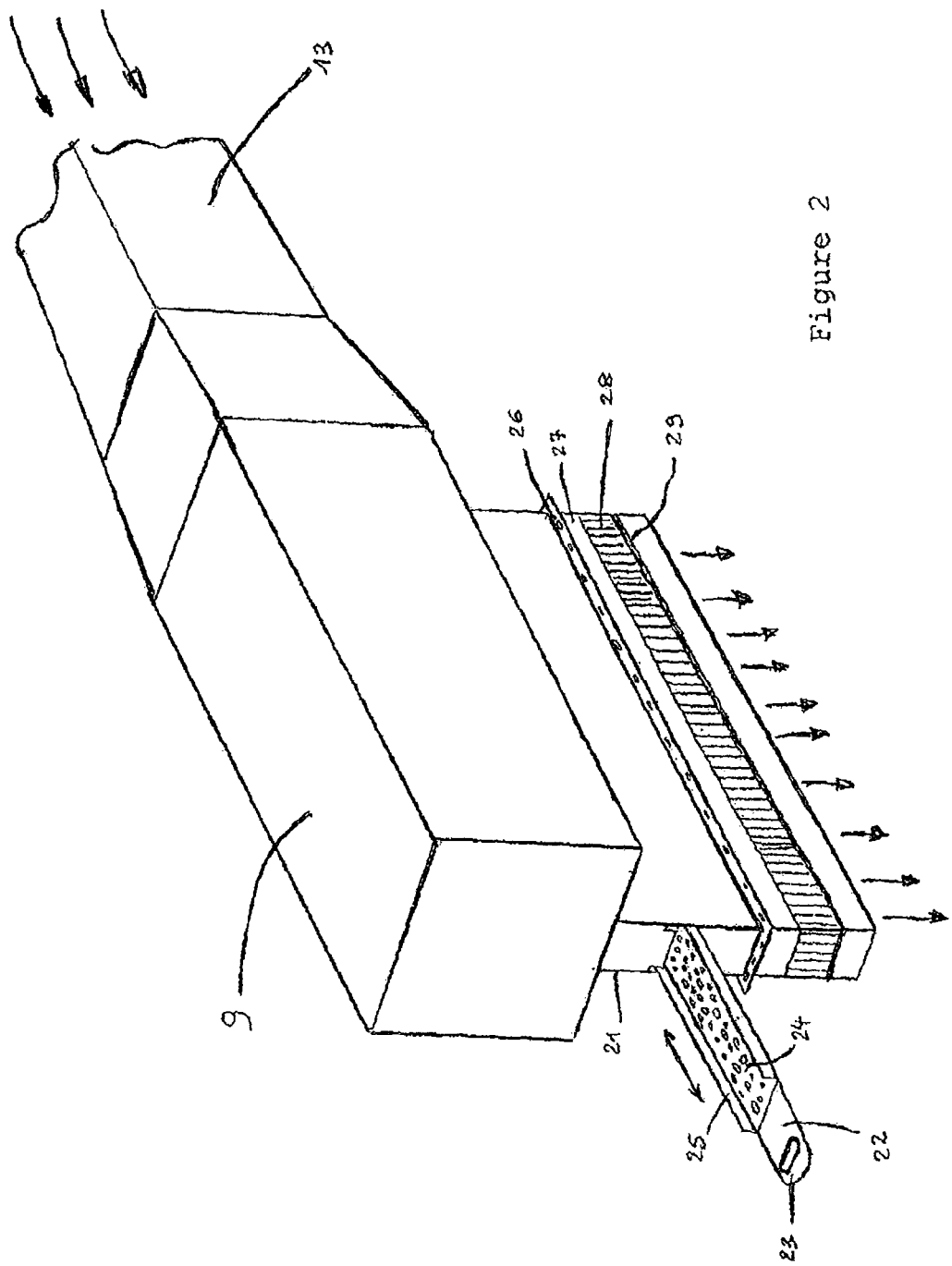
FIG. 2 is a perspective view of the diffusion box.
Figure 3:
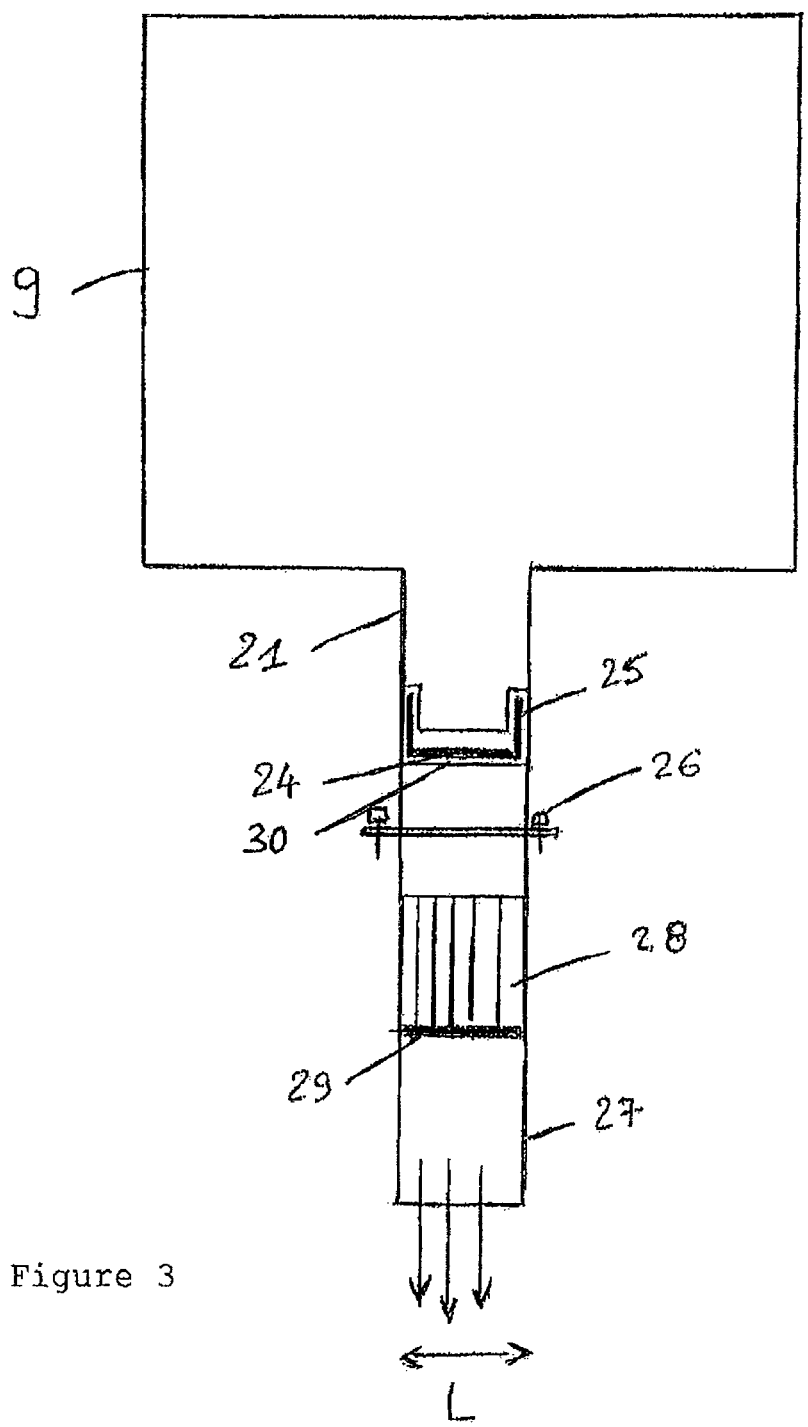
FIG. 3 is a side elevation.

The diffusion box represented in FIGS. 2 and 3 consists of a parallelepipedal chamber 9 having two front faces, one of which is closed and the other of which receives the flexible coupling 13 at the inlet. A parallelepipedal fitting 21 of the same length as the chamber issues from the large lower face. The width of the chamber 9 is the same as the width of the fitting 21. The width L of the fitting 21 ranges from 400 to 1200 mm. Mounted in this fitting 21 there is a movable sliding drawer 22 having a handle 23 and bearing a first perforated sheet 24 having a void rate of 10 to 60%. The drawer 22 slides in the fitting 21 by means of slide rails 25. The first perforated sheet 24 is covered with a thin metallic cloth 30 having a void rate of 25 to 50%.

Clamped at the fitting 21, by means of clamps 26, there is a channel 27 in which there is mounted a honeycombed bundle 28 supported by a second perforated sheet 29 having a void rate of 40 to 60%. The cells of the honeycombed bundle 28 have an equivalent diameter of the circle inscribed in the hexagon of 4 to 10 mm.

Figure 4:
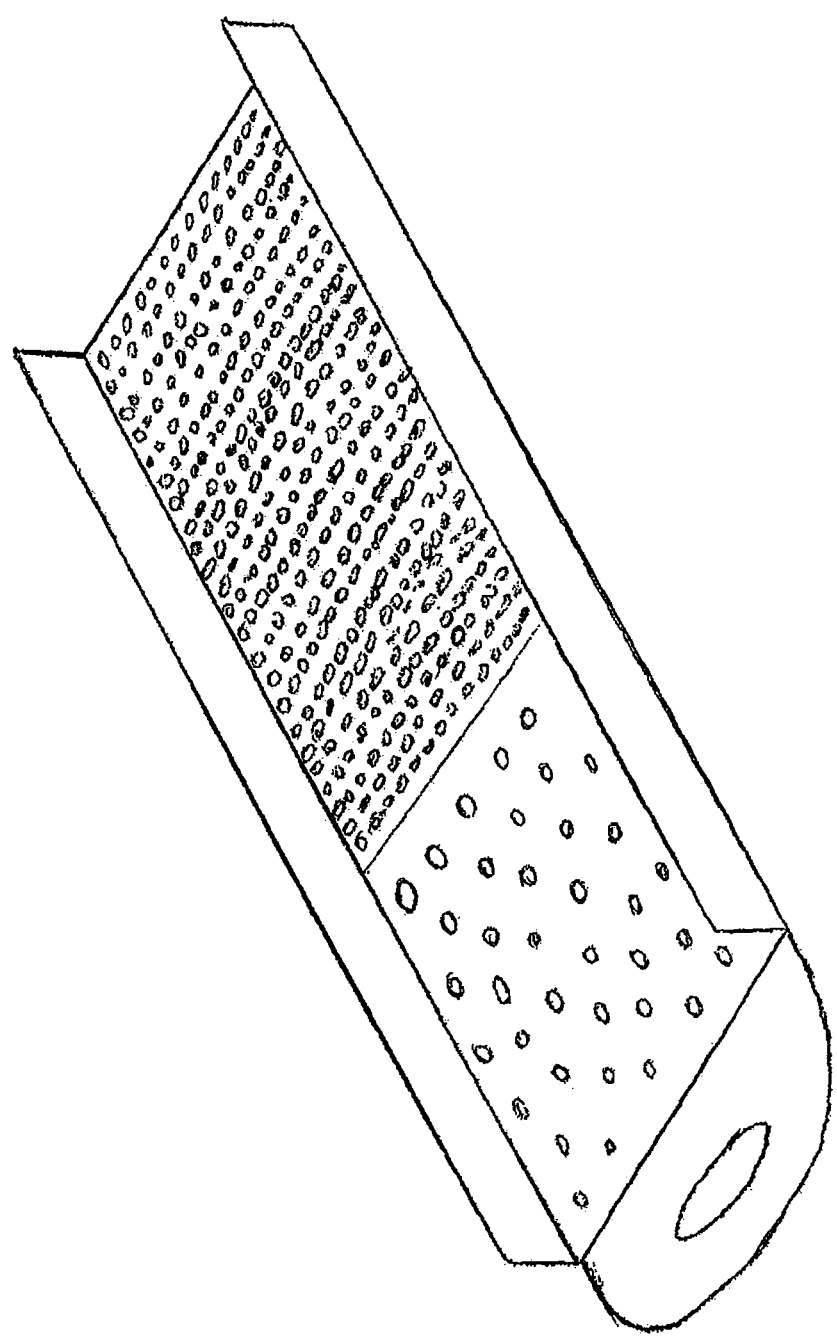
FIG. 4 is a perspective view of the perforated sheet.

FIG. 4 shows that the first perforated sheet 24 has a void-rate gradient.

In FIG. 4 the portion to the right of the first sheet has a void rate that is greater than the portion to the left. The portion to the right has a void rate of 40 to 60%. The portion to the left has a void rate of 10 to 20%. The variation in the void rate from right to left can be effected gradually or in stages. This variation can be obtained by means of the same number of perforations, but with the dimensions thereof increasing from right to left or by means of perforations having the same dimensions, but in a different number.

Figure 5:
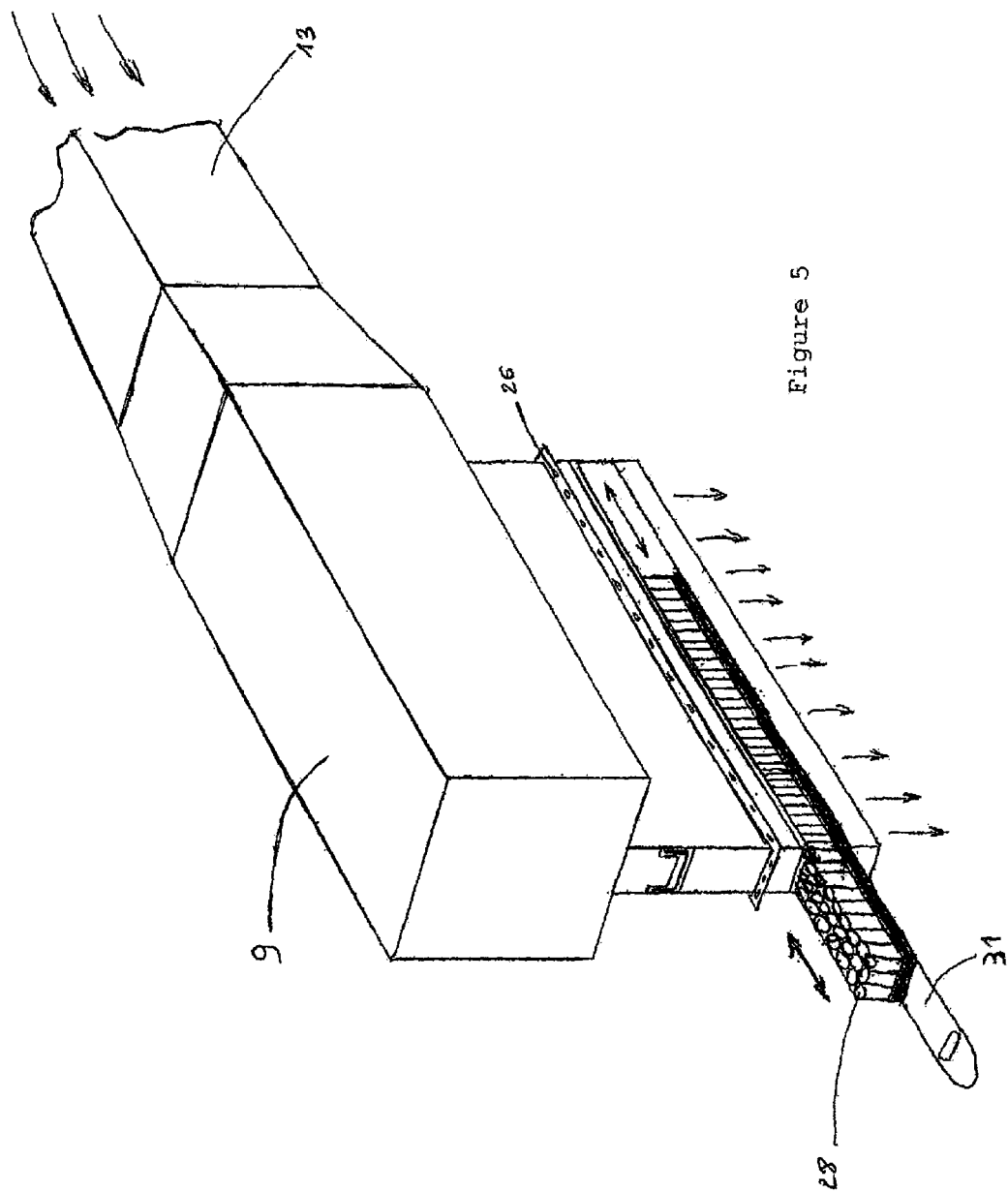
FIG. 5 is a perspective view of another diffusion box.

FIG. 5 is a view, similar to FIG. 2, of a diffusion box in which the honeycombed bundle 28 is mounted on a movable drawer 31.

What is claimed is:

1. An installation for drying a non-woven web which comprises:
    a fan (6) with a delivery and an intake,
    a heating oven (3) having an inlet and an outlet,
    an inlet conduit (C1) which has a branch and which connects the delivery of the fan (6) with the inlet of the oven (3) and sends delivered air to the inlet of the oven,
    a heat source (4) arranged in such a way that said air delivered is heated,
    an outlet conduit (C2) which connects the outlet of the oven (3) with the intake of the fan (6),
    a branch conduit (C3), in the branch of the inlet conduit (C1) upstream of the heat source (4), connecting the inlet conduit (C1) with an inlet of a drying device (10, 11),
    a means of transport (2) which displaces a web in the drying device (10, 11) and in the oven (3), the drying device (10, 11) being upstream of the oven (3) in the direction of displacement of the web, and
    a conduit (C4) for extracting air from the drying device (10, 11),
characterised in that
    the drying device (10, 11) comprises a diffusion chamber (10) having an inlet and an outlet fitting (21) in which there is mounted a perforated sheet (24), and
    the perforated sheet (24) has perforations and has a void-rate gradient that decreases from the inlet of the diffusion chamber (10).

2. An installation according to claim 1, characterised in that the perforated sheet (24) has a void rate between 10% and 60%.

3. An installation according to claim 1, characterised in that the perforated sheet (24) is mounted in a movable drawer (22) which has a handle (23) outside the fitting (21).

4. An installation according to claim 3, characterised in that the void rate of the perforated sheet (24) ranges from 40 to 60% from a side of the inlet of the diffusion chamber (10) to 10 to 20% at the place where the void rate is greatest.

5. An installation according to claim 1, characterised in that the perforated sheet (24) is covered with a thin metallic cloth (30) having a void rate between 25% and 50%.

6. An installation according to claim 1, further comprising a cloth wherein a dimension of the perforation of the cloth is from 0.1 mm to 1 mm.

7. An installation according to claim 1, characterised in that the fitting (21) is clamped at a channel (27) in which there is mounted a honeycombed bundle (28) with cells, a dimension of whose cells is greater than a dimension of the perforated sheet (24).

8. An installation according to claim 7, characterised in that the bundle (28) is supported by another perforated sheet (29) having a void rate that is greater than 40% to 60%.

9. An installation according to claim 7, characterised in that the bundle (28) is mounted in a movable drawer (31).

10. An installation according to claim 1, wherein the perforated sheet has perforations with a dimension from 2 to 8 mm.

11. An installation according to claim 6, wherein the cloth has perforations with a dimension from 0.5 to 2 mm and the perforated sheet has perforations with a dimension from 2 to 8 mm.

12. An installation for drying a non-woven web which comprises:
- a fan (6) with a delivery and an intake,
- a heating oven (3) having an inlet and an outlet,
- an inlet conduit (C1) which has a branch and which connects the delivery of the fan (6) with the inlet of the oven (3) and sends delivered air to the inlet of the oven,
- a heat source (4) arranged in such a way that the air delivered in the inlet conduit (C1) is heated,
- an outlet conduit (C2) which connects the outlet of the oven (3) with the intake of the fan (6),
- a branch conduit (C3), in the branch of the inlet conduit (C1) upstream of the heat source (4), connecting the inlet conduit (C1) with an inlet of a drying device (10, 11),
- a means of transport (2) which displaces a web in the drying device (10, 11) and in the oven (3), the drying device (10, 11) being upstream of the oven (3) in a direction of displacement of the web,
- a conduit (C4) for extracting the air from the drying device (10, 11),
- wherein the drying device comprises a diffusion chamber (10) having an outlet fitting (21) in which there is mounted a first perforated sheet (24) with perforations, wherein downstream of the first perforated sheet (24) is mounted in the outlet fitting (21) or in a channel which is clamped to the fitting (21) a honeycombed bundle (28), the dimension of whose cells is greater than that of the perforations of the perforated sheet (24).

13. An installation according to claim 12, wherein the bundle (28) is supported by another perforated sheet (29) having a void rate that is greater than 40% to 60%.

14. An installation according to claim 12, wherein the bundle (28) is mounted in a movable drawer (31).

15. An installation according to claim 12, wherein a ratio of length of the bundle to equivalent diameter of the bundle is higher than 10.

16. A chamber (10) having an inlet and an outlet fitting (21), wherein a first perforated sheet (24) with perforations is mounted in the outlet fitting (21) and has a first void-rate that decreases from a place of the chamber nearest the inlet and range from 10 and 60%, and downstream of the first perforated sheet (24) is mounted in the outlet fitting (21) or in a channel which is clamped to the fitting (21) a honeycombed bundle (28), the dimension of whose cells is greater than that of the perforations of the perforated sheet (24).

17. The chamber (10) of claim 16 wherein the first perforated sheet (24) is covered with a metal cloth with perforations (3) wherein the perforations of the cloth are smaller than the perforations of the first perforated sheet (24) and the cloth has a void-rate from 25 to 50%.

18. The chamber (10) of claim 16, wherein the first perforated sheet has perforations with a dimension from 2 to 8 mm.

19. The chamber (10) of claim 16, further comprising a cloth, wherein the cloth has perforations with a dimension from 0.5 to 2 mm.

20. The chamber (10) of claim 19, wherein the first perforated sheet has perforations with a dimension from 2 to 8 mm.

* * * * *